United States Patent
Dvoskin

(10) Patent No.: US 6,764,255 B1
(45) Date of Patent: Jul. 20, 2004

(54) CUTTING TOOL FOR PRECISION MACHINING A HYDRODYNAMIC BEARING BORE IN STAINLESS STEEL SLEEVE

(75) Inventor: Lev M. Dvoskin, Aptos, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/690,167

(22) Filed: Oct. 16, 2000

Related U.S. Application Data

(60) Provisional application No. 60/159,741, filed on Oct. 15, 1999.

(51) Int. Cl.$^7$ ................................................ B23B 7/00
(52) U.S. Cl. ...................................... 407/118; 407/119
(58) Field of Search ............................... 407/118, 113, 407/119; 408/713

(56) References Cited

U.S. PATENT DOCUMENTS

| | | | |
|---|---|---|---|
| 360,213 A | * 8/1972 | Reichert | ..................... 33/18 R |
| 4,844,669 A | 7/1989 | Tsujimura et al. | |
| 5,137,398 A | 8/1992 | Omori et al. | |
| 5,261,767 A | * 11/1993 | Tsujimura et al. | .......... 408/713 |
| 5,340,246 A | 8/1994 | Tukala | |
| 5,370,716 A | 12/1994 | Mehrotra et al. | |
| 5,478,634 A | 12/1995 | Setoyama et al. | |
| 5,702,808 A | 12/1997 | Ljungberg | |
| 5,718,542 A | 2/1998 | Basteck | |
| 5,823,720 A | 10/1998 | Moore | |
| 5,829,927 A | 11/1998 | Nakamura et al. | |
| 5,890,853 A | 4/1999 | Hiranaka | |
| 5,958,569 A | 9/1999 | Leverenz et al. | |
| 5,976,707 A | 11/1999 | Grab | |

OTHER PUBLICATIONS

"Kennametal Grade System for Cutting Materials" Lathe Tooling Catalog 6000, Jan. 1, 1999; 4 pgs.
"Machining Recommendations for Turning" Kyocera Ceratip General Catalog; 2 pgs.
"Carbide Grade Comparison Chart" Circle Machine Company, Gold Edition, 1997; 3 pgs.
"The Most Comprehensive Range of Grooving Tools Available" ph HORN ph The Complete Solution Combined Catalog, Feb. 1999; 4 pgs.
"Aluminum Oxide Coated Grades for Turning" Sumitomo Electric Carbide; 2 pgs.
"Inserts and Toolholders for Turning, Threading, Grooving and Cut–Off" Turning Catalog and technical Guide; 7 pgs.

* cited by examiner

*Primary Examiner*—Willmon Fridie, Jr.
(74) *Attorney, Agent, or Firm*—Moser Patterson & Sheridan LLP

(57) ABSTRACT

A cutting tool for machining stainless steel including a tool nose geometry with several facets. The tool includes a nose comprising a leading edge which chips and removes stock from the edge surface, the leading edge bearing adjacent a calibration edge post which the bore is rotated to thereby calibrate the bore. The calibration edge or facet has a length equal to the feed per revolution. This same side has a cutting angle length equal to zero. A hollow cathode discharge method of TiCN coating with no more than three micron thickness is used. This coating method creates a high density of plasma vapor, does not contain micro particles, produces a very dense film which completely replicates the finish of the surface being coated, prevents buildup and increases tool performance. The leading facet preferably has a cutting edge angle with the tool direction of travel through the bore surface equal to 45°.

20 Claims, 4 Drawing Sheets

FIG. 2A
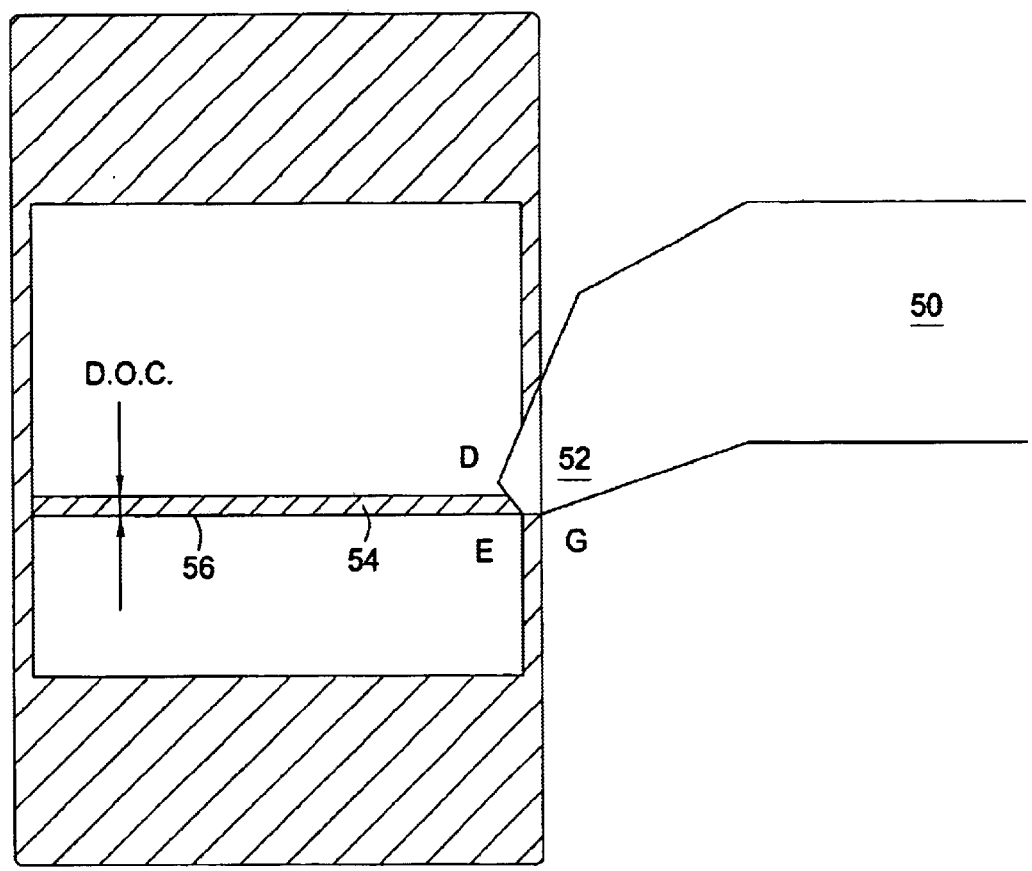
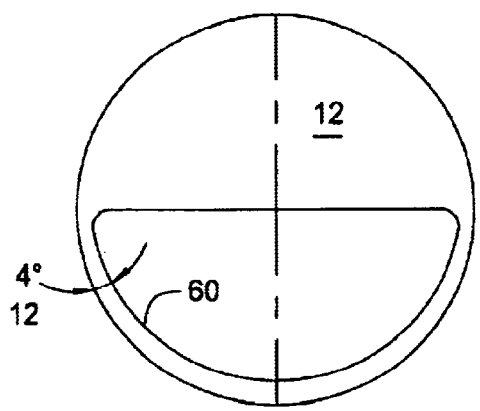
FIG. 2B

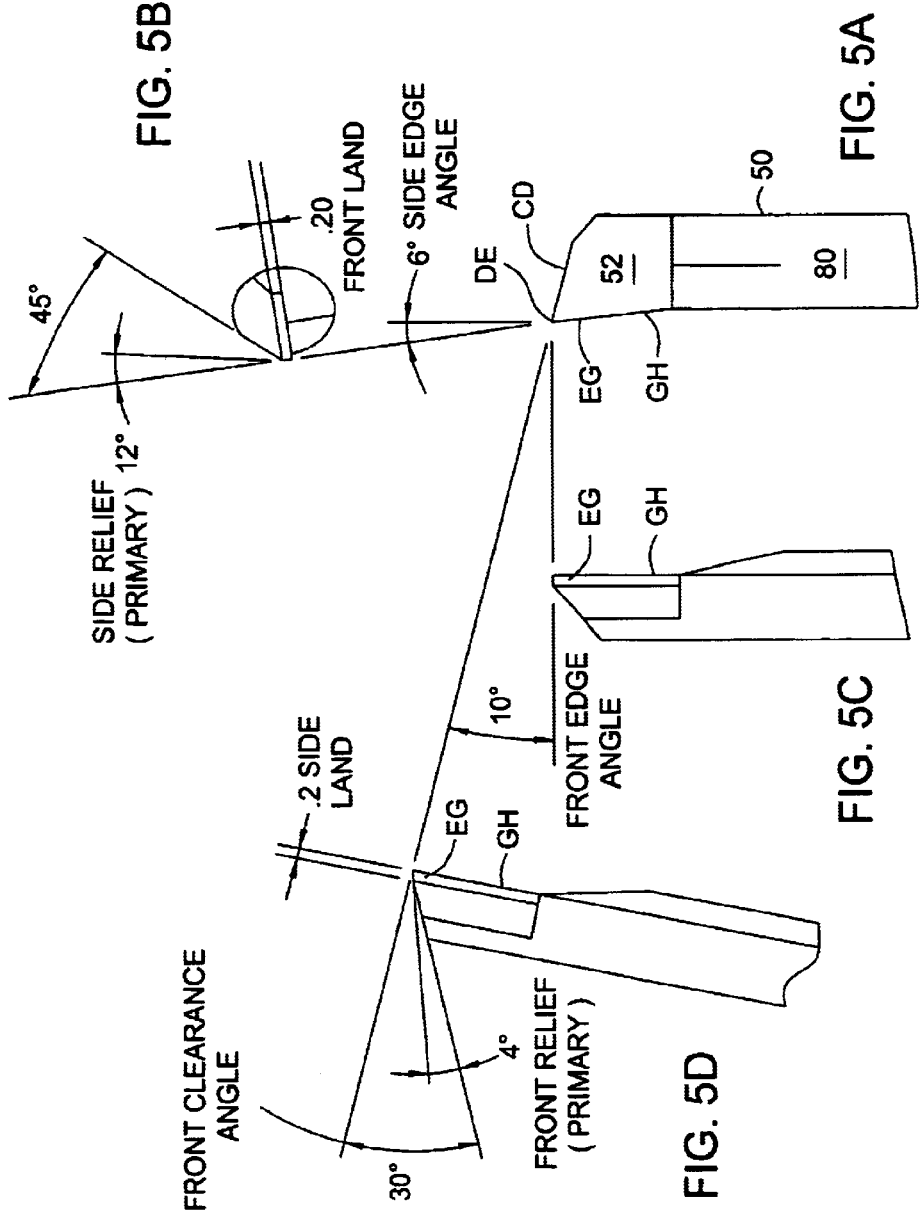

CUTTING TOOL FOR PRECISION MACHINING A HYDRODYNAMIC BEARING BORE IN STAINLESS STEEL SLEEVE

CROSS-REFERENCE TO RELATED APPLICATION

This application claims priority to U.S. Provisional Patent Application Serial No. 60/159,741 filed Oct. 15, 1999 entitled "Cutting Tool for Ultra Precision Machining Stainless Steel" by Lev M. Dvoskin, and assigned to the assignee of this application; the priority of that provisional application which is hereby claimed.

FIELD OF THE INVENTION

The present invention relates to precision boring tools for internal machining of a bore, and more specifically the invention relates to a cutting tool that has improved cutting properties and cutting lifetime when precision machining stainless steel and equivalent material to very fine tolerances.

BACKGROUND OF THE INVENTION

The cutting tool in an ultra-precision machining of stainless steel must have a capability of stable cutting and keeping tight tolerances, providing surface finish and roundness on a work piece during the tools time life, and at the same time provide the required output. One way to increase output is to increase the cutting conditions, that is, the cutting speed and the feed rate. An increase in cutting speed will decrease the tools lifetime due to the increased cutting temperature, and the build-up on the cutting surface of the tool. Two potential approaches to solving this problem should be considered: a more efficient design for the cutting nose of the tool, and a better coating for the nose.

In order to protect a tool's working surface, different types of coating have been applied. This coating can be single or multiple layers applied as a PVD/CVD coating. Several coating types have been recommended in the past, including a single layer PVD TiN coating for most stainless steels at low to moderate cutting speed, or three layers comprising TiN, TiCN, and TiN applied as a CVD/PVD coating for semi-finishing to finishing on austenitic stainless steels. Alternatively, multiple layers of TiN, $AL_2O_3$, and TiN/TiCN is proposed for general purpose to high speed cutting of stainless steel; another proposal for cutting stainless steel comprises four layers, including TiN, TiCN, TiC, and TiAlN.

However, uncoated tools have a smaller radius of cutting edge, and greater edge toughness than a coated tool. Coated tools do not work well on interrupted cuts and on cuts of varying depth due to mechanical and thermal shocks as well as fatigue. This has become a serious problem of ultra-precision machining, such as is required for making the bore in the sleeve of a hydrodynamic bearing and the like; this is especially true for the finish pass when the cutting process does the burnishing and chattering which will effect the part's roundness and surface finish. For these reasons, most companies do not use a coating on a cutting tool that is to be used for finishing of stainless steel.

Tests with Boring tools with a TiN single layer coating have established that this coating does not have a good adhesion to substrate, has a droplet phase, and does not prevent buildup on the cutting corner of the tool. It appears that the droplet phase or micro particles are present due to cathodic arc deposition method of applying the coating. This increases the roughness of the cutting surface, dulls sharp cutting edges, and does not have reliable adhesion to the substrate. The multilayer coatings described above are usable for rough and semifinish cutting, but not for the ultra smooth finish needed for the base of a hydrodynamic bearing due to the increase in the radius of the cutting edge, and inevitable coat chipping.

As to increasing the feed rate, a primary way to increase the feed rate and keep the required surface finish is to increase the tool nose radius. The proper nose radius is one of the most important factors when a specific surface finish and roundness are required. However, the nose radius is usually limited by the work piece geometry. That is the necessary radii or fillets which must be defined. The other limitation increasing tool nose radius is bore roundness which depends on tool deflection under thrust force. Cutting force measurements have established that with increasing tool nose radius from 50 $\mu$m to 250 $\mu$m the thrust force increases about three times, and the cutting process has a tendency toward chattering. Therefore, the problems with optimizing cutting conditions for a hydrodynamic bearing bore by optimizing cutting speed and feed rate remain.

SUMMARY OF THE INVENTION

In summary, the cutting tool for machining stainless steel, according to this invention is designed to provide both an increase cutting speed and an increase in feed rate. As a modification of the known round nose geometry, according to the present invention, a tool nose geometry with several facets is proposed.

Further, instead of the cathodic arc deposition method of TIN coating, a hollow cathode discharge method of TiCN coating with no more than three micron thickness is proposed. This coating method creates a high density of plasma vapor, does not contain micro particles, produces a very dense film which completely replicates the finish of the surface being coated, prevents buildup and increases tool performance.

These and other objectives of the present invention are achieved providing a tool nose geometry which has multiple facets. Specifically, a tool is provided including a nose comprising a leading edge which chips and removes stock from the edge surface, the leading edge being adjacent a calibration edge which thereby calibrates the bore surface as the tool is fed and the sleeve is rotated to form the bore opening. In a preferred embodiment the calibration edge or facet has a length equal to the feed per revolution. This same side has a cutting angle length equal to zero. The combination of these requirements provides an ideal surface, as the impression formed on the work piece by the nose of the cutting tool is a mirror image of the edge EG, provided minimum deflection of the work piece or tool occurs.

The leading facet preferably has a cutting edge angle with the direction of feed of the tool through the bore equal to 45° which makes the cutting process smooth, and provides strengthening of the point which is common to the end cutting edge and the cutting surface. Further, appropriate relief angles are provided in the cutting surface, the leading nose edge, and the upper nose geometry to provide sufficient strength to the nose of the tool, and to further provide that chipping and deflection are minimized in the leading edge of the tool so that the machine bore of the central bore can occur in a single pass of the tool.

Other features and advantages of the present invention would become apparent to a person of skill in the art who studies the present invention disclosure given with respect to the following figures.

BRIEF DESCRIPTION OF THE DRAWINGS

FIGS. 2A and 2B are vertical sectional end and side schematic views of the boring tool of the invention as used to define a bearing bore.

FIGS. 5A–5D are side and end views fo the tool of this invention.

DETAILED DESCRIPTION OF A PREFERRED EMBODIMENT

Figure 1:
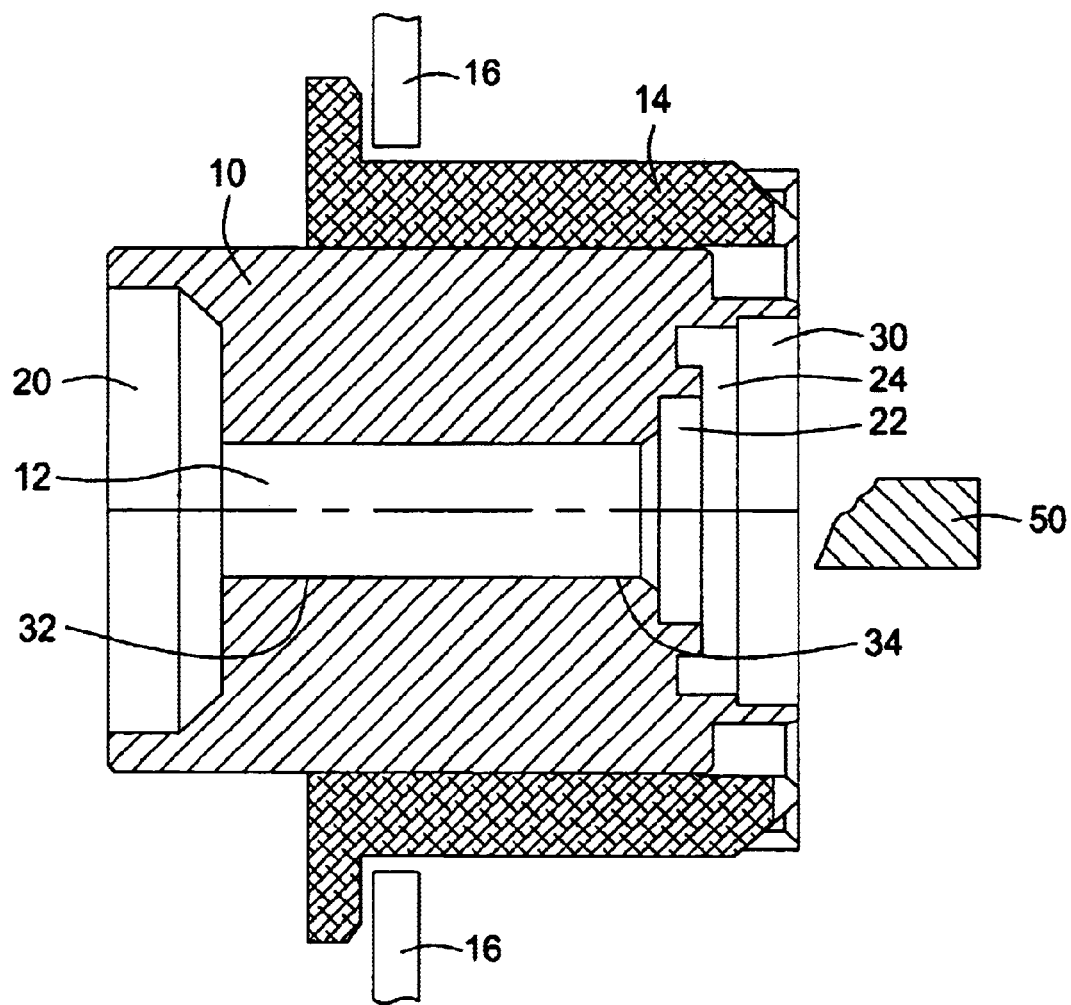
FIG. 1 is a vertical sectional view of a hydrodynamic bearing based spindle motor hub.

The present invention relates to a precision boring tool for internal machining of a bore. More specifically, the invention pertains to a cutting tool that has improved cutting properties for ultra precision machining of stainless steel, and especially a bore cut through stainless steel such as used in forming a hydrodynamic bearing. Such a bearing is shown in the vertical section of FIG. 1 which includes a sleeve 10 having a bore 12 defined through the center thereof. The sleeve supports on its outer surface a hub 14 which will support one or more discs 16 for rotation in a disc drive. A shaft (not shown) will be inserted through the center of the bore 12; as is well known in the art, the shaft will be inserted into a base plate which is inserted into a space 20 at one end of the bore 12. At the opposite end, the shaft will typically have a thrust plate which fits in region 22, facing a counterplate 24 and retainer plate 30. All this is well-known in this technology; the tool is not limited to forming a bore for any specific design of hydrodynamic bearing.

As is well-known in this technology, it is especially important that the bore have a smooth finish in the regions 32, 34 which are typically located near either end of the shaft where the journal bearings that support the shaft for rotation will be located. The cutting tool for machining the stainless steel of the sleeve 16 must be capable of stable cutting and keeping tight tolerances, surface finish and roundness throughout the tool's lifetime, and at the same time provide the required output so that a suitable piece work rate can be maintained. In order to achieve this desired speed and surface finish, the tool 50, which is illustrated at the right side of FIG. 1, has been developed.

The tool 50 is shown as it is used to form the bore 12 of FIG. 1 in the schematic views of FIG. 2A and 2B. In FIG. 2A, the nose region 52 of the tool 50 is shown as it defines the bore by cutting away a layer of material 54 to form the smooth surface 56 of the finished bore. The key surface regions or facets DE and EG of the tool nose are shown in this figure; the function and criticality of these surfaces will be explained with reference to the figures below. FIG. 2B is an end on view of the same tool as it appears inside the bore 12. This figure is shown primarily to demonstrate the critical relief angularity of one surface away from the cutting edge E. This angularity must be in the order of about 40 in order to provide the necessary clearance so that the point 60 does not contact the side of the bore.

Figure 3:
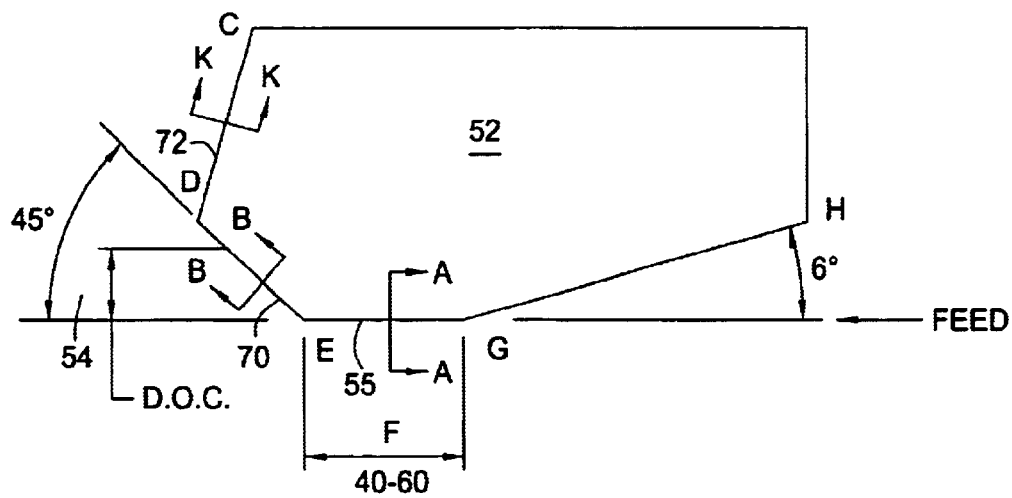
FIG. 3 is a side view of a face of the boring tool.

In order to achieve the desired feed rate while maintaining the required surface finish, which must be measured and calibrated to within microns over a substantial length of the bore, the proper nose radius of the tool is one of the most important factors. However, it is known that the nose radius is usually limited by the work piece geometry and the necessity of radii and fillets. The other limitation in increasing tool nose radius is maintaining bore roundness, which can be negatively effected by tool deflection under thrust force. Thus the tool nose geometry and specifically, the face geometry shown in FIG. 3, is adopted to allow an increase in feed rate while meeting the necessary requirements for roundness on the work piece and prevention of chattering. It should be noted in this regard that in the present design, in the preferred mode of operation the tool 50 is only moved axially; the sleeve is rotated to achieve the desired bore.

Figure 4:
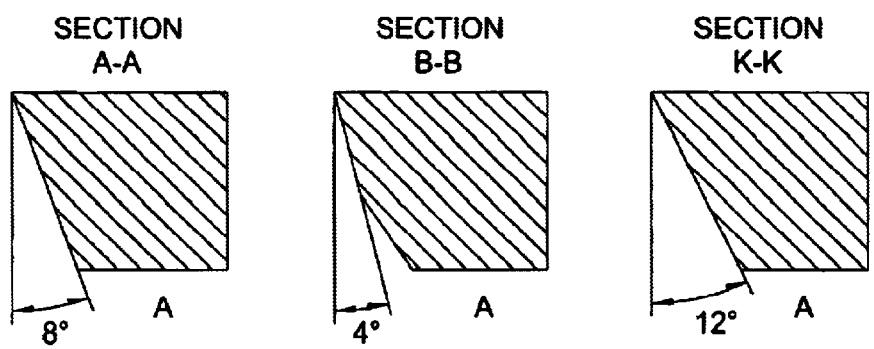
FIGS. 4A–4C are views taken on section lines through primary edges of the face of FIG. 3.

Instead of a round nosed geometry as proposed in the prior art, what is utilized here is a tool nosed geometry with several facets which provide both strength for the cutting and smoothing surface. Referring to FIG. 3, which is a side view of the nose 52 shown schematically in FIG. 2A, the facet EG 55 is the facet which cuts and finishes the side of the finished bore 56; this facet which is the cutting and finishing facet which establishes the smoothness of the bore is illustrated in FIG. 3 performing this cutting and finishing function. Preferably, this facet 55 which can be called the calibration facet has a length equal to F or feed per revolution. In a preferred form, edge EG side cutting angle is equal to zero. Referring to FIG. 4A, the facet EG 55 is in fact quite short, in the order of 40–60 microns. Further, as shown at section AA, the side relief angle is about 8° to keep the deflection form within permissible ranges along calibration facet EG.

The facet DE, which is the nose cutting facet axially adjacent the facet EG, is shown establishing the depth of cut 54. This cutting facet must of course be at a length greater than the depth of cut; preferably, its length is about 1.7 DOC (Depth of Cut). As shown in the figure, it is preferably is at an angle of about 45° with the direction of feed of the tool over the surface 56 of the bore. Further, referring to the section line BB, which is shown in FIG. 3, and the view of section BB shown in FIG. 4B, it can be seen that a relief angle of at least 4° is to be defined. This relief angle of 4° in cross section BB is intended to provide enough strength to edge DD while protecting it from chipping; further, it protects this side edge from scoring the edge of the bore which is being formed. The facet DE, 70 is also short, in the order of about 40 microns.

The facet DC 72, which is at a shallow angle to the facet DE is a relief facet which makes no metal contact. It provides clearance for the nose as it moves through the bore. It can be relatively long as It provides much of the support strength of the nose. The side relief angle shown at section KK, taken across section 72, is preferably about 12°; it is limited to about this angle to provide enough strength to the nose and specifically edges DE and EG to keep any deflection force within a permissible range; it also provides the capability to machine the bore and finish the surface 56 in a single pass.

The FIGS. 5A–5D are additional views of the nose of the tool 50. FIG. 5A is a larger view of the face 52 shown in FIG. 3, shown attached to the supporting trunk 80 of the overall tool 50. The edges CD, DE, EG, and GH are all shown in this view as they would appear from the side of the face of the tool. The edges are not shown to scale, but are presented here to understand their relationship to the remainder of the tool.

FIG. 5B is an end view of the same tool nose. FIG. 5C is a view shown looking at the nose of the tool and is presented to show the relationship of the edges defined by surfaces EG and GH. Finally, FIG. 5D is a view substantially the same as FIG. 5C, which is presented to provide further illustration of the critical relief angles which are to be provided at the nose of the tool to provide strength to the nose while providing sufficient relief to prevent scoring of the bore by edges of the nose.

Further, it is also to be defined that the radius of the cutting edges CD, DE, EG, and GH should be no more than 3 μm; and the surface finish on the face side and end surfaces of the tool is to be no more than RA 0.02 μm.

In summary, providing the facet EG with a length equal to the feed per revolution and a side cutting angle equal to zero, the tool provides an ideal surface finish, as close as possible to an exact mirror image of the edge EG, and with minimum deflection of the tool. This is because the leading edge DE removes the stock of the material and produces the chips, while the edge EG calibrates the bore. This combination of functions, especially with a cutting edge angle of about 45°, provides a smooth cutting process and a very strong edge cutting point E.

By providing a length DE of the edge which removes material stock, chosen to be about 1.7 DOC, the depth of cut is optimized; the upper level defined by the point D limits the radii and work piece geometry.

The cited requirements for the tool surface finish of about 0.02 allows the tool to be prepared for a coating which optimizes the use of the tool. This coating is preferably a coating of TiN applied using a hollow cathode discharge of coating TiCN to no more than about 3 μm thickness. This method creates a very high density of plasma vapor, does not contain micro particles, produces a very dense film, which will replicate the finish of the surface being coated, prevents buildup and increases tool performance.

The small relief angle of 4° in cross section BB of FIG. 4B, the cross section being taken across the primary cutting edge DE of the tool provides substantial strength to this edge and protects it from chipping. The side relief angle of about 8° in cross section AA (FIG. 4A) of the finishing surface provides strength to this edge EG to keep the deflection force in a permissible range and limits wear on the tool. The combination of the positive end cutting edge angle CD formed between the relief surface CD and the cutting surface DE and the relief angle of 12° in the cross section KK (FIG. 4C) of the relief surface CD provides the capability to both machine the bore and finish the surface of the work piece in one pass.

Other features, advantages and variations on the preferred embodiment described above will become apparent to a person of skill in the art who studies the present invention disclosure. Therefore, the scope of this invention is to be limited on by the following claims.

What is claimed:

1. A cutting tool for finish machining the bore of a sleeve of a hydrodynamic bearing, comprising a nose including at least a cutting facet for establishing the depth of cut down to a surface of the bore and a calibration facet for establishing the finished surface of the bore and a relief facet having an end point in common with the cutting facet and being at a shallow angle to the cutting facet to provide clearance for the nose as it moves through the bore while providing support strength to the nose.

2. A cutting tool as claimed in claim 1 wherein the cutting facet is an angle of about 45° with the finish surface of the bore.

3. A cutting tool as claimed in claim 2 wherein the cutting facet has a relief angle of about 4° to provide the necessary clearance to avoid contacting the side of the bore.

4. A cutting tool as claimed in claim 1 wherein the calibration facet has a side edged cutting angle close to zero, and a length equal to the feed rate per revolution.

5. A cutting tool as claimed in claim 4 wherein the calibration facet has a length of a about 40 to 60 microns.

6. A cutting tool as claimed in claim 1 wherein the calibration facet has a side relief angle of about 8°.

7. A cutting tool as claimed in claim 2 wherein the length of the cutting facet is about 1.7 depth of cut.

8. A cutting tool as claimed in claim 2 including a coating of TiCN.

9. A cutting tool as claimed in claim 1 wherein the cutting facet and the calibrations facet share a common meeting point.

10. A cutting tool as claimed in claim 1 wherein the relief facet has a side relief angle of about 12° to strengthen the nose and minimize the deflection force on the nose of the tool.

11. A cutting tool for finish machining the bore of a sleeve of a hydrodynamic bearing the tool, comprising:
a nose including at least a cutting facet for establishing the depth of cut down to a surface of the bore and a calibration facet for establishing the finished surface of the bore; and
a supporting trunk for supporting the nose and moving the nose linearly through the bore of the hydrodynamic bearing, the hydrodynamic bearing comprising a sleeve which is rotated about the tool nose to finish the bore of the sleeve.

12. A cutting tool as claimed in claim 11 wherein the cutting facet has an angle of about 45° with the path of travel of the tool nose through the bore of the sleeve.

13. A cutting tool as claimed in claim 12 wherein the calibration facet has a side-edged cutting angle of about zero, and a length substantially equal to the feed rate per revolution.

14. A cutting tool as claimed in claim 13 wherein the calibration facet has a length of about 40 to 60 microns and the cutting facet has a length of about 40 microns.

15. A cutting tool as claimed in claim 13 wherein the length of the cutting facet is about 1.7 times the depth of cut down to the finished bore of the sleeve.

16. A cutting tool as claimed in claim 14 including coating of TiCN on at least a portion of a surface of the nose of the tool.

17. A cutting tool for finish machining the bore of a sleeve of a hydrodynamic bearing, comprising:
a nose including means for establishing the depth of cut down to a finish surface of the bore and means for establishing a smooth finish surface of the bore; and
a supporting trunk for supporting the nose and moving the nose linearly through the bore of the hydrodynamic bearing, the hydrodynamic bearing comprising a sleeve which is rotated about the tool nose to finish the bore of the sleeve.

18. A cutting tool as claimed in claim 17 wherein the means for establishing the depth of a cut down to a thinner surface comprise a cutting facet defined at the nose, and the nose further comprising a calibration facet which comprises the means for establishing a smooth finish surface of the bore.

19. A cutting tool as claimed in claim 18 wherein the calibration facet has a length equal to the feed rate per revolution of the tool through the bore.

20. A cutting tool as claimed in claim 19 wherein the calibration facet has a side edged cutting angle close to zero.

* * * * *